United States Patent
Seo et al.

(10) Patent No.: US 12,085,743 B2
(45) Date of Patent: Sep. 10, 2024

(54) POLARIZING PLATE, LIQUID CRYSTAL PANEL AND DISPLAY DEVICE

(71) Applicant: LG CHEM, LTD., Seoul (KR)

(72) Inventors: Jung Hyun Seo, Daejeon (KR); Kyun Il Rah, Daejeon (KR); Young Gon Kim, Daejeon (KR); Taek Geun Nam, Daejeon (KR); Gae Sung Kim, Daejeon (KR); Hyun Soo Lee, Daejeon (KR); Keon Woo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/978,581

(22) PCT Filed: Apr. 26, 2019

(86) PCT No.: PCT/KR2019/005062
§ 371 (c)(1),
(2) Date: Sep. 4, 2020

(87) PCT Pub. No.: WO2020/004804
PCT Pub. Date: Jan. 2, 2020

(65) Prior Publication Data
US 2021/0018668 A1 Jan. 21, 2021

(30) Foreign Application Priority Data
Jun. 29, 2018 (KR) .................. 10-2018-0075899

(51) Int. Cl.
*G02B 5/30* (2006.01)
*G02B 1/11* (2015.01)
(Continued)

(52) U.S. Cl.
CPC ............ *G02B 5/3041* (2013.01); *G02B 1/11* (2013.01); *G02B 1/14* (2015.01); *G02F 1/133528* (2013.01); *G02F 1/133531* (2021.01)

(58) Field of Classification Search
None
See application file for complete search history.

(56) References Cited

U.S. PATENT DOCUMENTS 7,282,091 B2 10/2007 Hashimoto
7,622,055 B2 11/2009 Nakano et al.
(Continued)

FOREIGN PATENT DOCUMENTS

CN 101644792 A 2/2010
CN 106488839 A 3/2017
(Continued)

OTHER PUBLICATIONS

International Search Report and Written Opinion issued for International Application No. PCT/KR2019/007955 on Oct. 17, 2019, 9 pages.
(Continued)

*Primary Examiner* — Richard H Kim
(74) *Attorney, Agent, or Firm* — ROTHWELL, FIGG, ERNST & MANBECK, P.C.

(57) ABSTRACT

The present invention relates to a polarizing plate, a liquid crystal panel and a display device, and more specifically to a polarizing plate including a polarizer, and a hard coating layer having a thickness of 10 μm or less and a light-transmitting substrate which are positioned so as to face each other on the basis of the polarizer, and to a liquid crystal panel and a display device including the same.

13 Claims, 3 Drawing Sheets

(51) Int. Cl.
*G02B 1/14* (2015.01)
*G02F 1/1335* (2006.01)

(56) References Cited

U.S. PATENT DOCUMENTS

| | | | |
|---|---|---|---|
| 9,069,197 | B2 | 6/2015 | Kuroda et al. |
| 9,995,953 | B2 | 6/2018 | Kuroda et al. |
| 10,042,194 | B2 | 8/2018 | Kuroda et al. |
| 10,048,522 | B2 | 8/2018 | Kuroda et al. |
| 10,409,105 | B2 | 9/2019 | Kuroda et al. |
| 2007/0243364 | A1 | 10/2007 | Maekawa et al. |
| 2008/0062366 | A1 | 3/2008 | Ohtani et al. |
| 2013/0126085 | A1 | 5/2013 | Suzuki et al. |
| 2014/0043683 | A1* | 2/2014 | Jo ............... G02F 1/133528 |
| | | | 359/483.01 |
| 2014/0178706 | A1 | 6/2014 | Park et al. |
| 2015/0226884 | A1 | 8/2015 | Park et al. |
| 2016/0025909 | A1 | 1/2016 | Yeo |
| 2017/0235023 | A1 | 8/2017 | Mita et al. |
| 2017/0299779 | A1 | 10/2017 | Mita et al. |
| 2018/0200988 | A1 | 7/2018 | Kaneiwa et al. |
| 2019/0103589 | A1 | 4/2019 | Iida et al. |
| 2019/0154884 | A1 | 5/2019 | Kim et al. |
| 2019/0346606 | A1* | 11/2019 | Mashima ............ G02B 5/3016 |
| 2020/0142256 | A1 | 5/2020 | Kim et al. |
| 2020/0301055 | A1* | 9/2020 | Lee ............... G02B 5/3033 |
| 2021/0165272 | A1 | 6/2021 | Liu |

FOREIGN PATENT DOCUMENTS

| | | |
|---|---|---|
| CN | 107076908 A | 8/2017 |
| EP | 1930748 A1 | 6/2008 |
| JP | 2001-332132 A | 11/2001 |
| JP | 2005-014584 A | 1/2005 |
| JP | 2006-251043 A | 9/2006 |
| JP | 2008-107432 A | 5/2008 |
| JP | 2009-166322 A | 7/2009 |
| JP | 4776754 B2 | 9/2011 |
| JP | 2012-198534 A | 10/2012 |
| JP | 2013-010199 A | 1/2013 |
| JP | 5267920 B2 | 8/2013 |
| JP | 2014-095880 A | 5/2014 |
| JP | 2014206702 * | 10/2014 ............ G02B 1/14 |
| JP | 2015-143778 A | 8/2015 |
| JP | 2015-532459 A | 11/2015 |
| JP | 2015-215593 A | 12/2015 |
| JP | 2015-222368 A | 12/2015 |
| JP | 6314228 B2 | 4/2018 |
| KR | 10-0637632 B1 | 10/2006 |
| KR | 10-2007-0111352 A | 11/2007 |
| KR | 10-2010-0018462 A | 2/2010 |
| KR | 10-2014-0069350 A | 6/2014 |
| KR | 10-2014-0080430 A | 6/2014 |
| KR | 10-2014-0091200 A | 7/2014 |
| KR | 10-2015-0099470 A | 8/2015 |
| KR | 10-2016-0012353 A | 2/2016 |
| KR | 10-2016-0065409 A | 6/2016 |
| KR | 10-1730855 B1 | 4/2017 |
| KR | 10-2017-0063673 A | 6/2017 |
| KR | 10-1772265 B1 | 8/2017 |
| KR | 10-2017-0121522 A | 11/2017 |
| KR | 10-2018-0014798 A | 2/2018 |
| KR | 10-2018-0060028 A | 6/2018 |
| KR | 10-2019-0008154 A | 1/2019 |
| TW | 201738591 A | 11/2017 |
| WO | 2007-026659 A1 | 3/2007 |
| WO | 2009145150 A1 | 12/2009 |
| WO | 2015-166941 A1 | 11/2015 |
| WO | 2015-190190 A1 | 12/2015 |
| WO | 2016-052531 A1 | 4/2016 |
| WO | 2017-170216 A1 | 10/2017 |
| WO | 2017-188552 A1 | 11/2017 |

OTHER PUBLICATIONS

International Search Report and Written Opinion issued for International Application No. PCT/KR2019/005062 on Aug. 9, 2019, 10 pages.

Extended European Search Report dated Jan. 29, 2021, of the corresponding European Patent Application No. 19826950.8, 8 pages.

Extended European Search Report dated Feb. 19, 2021, of the corresponding European Patent Application No. 19826293.3, 7 pages.

* cited by examiner

POLARIZING PLATE, LIQUID CRYSTAL PANEL AND DISPLAY DEVICE

CROSS-REFERENCE TO RELATED APPLICATION(S)

This application is a 35 U.S.C. 371 National Phase Entry Application from PCT/KR2019/005062, filed on Apr. 26, 2019, designating the United States, which claims the benefit of the filing date of Korean Patent Application No. 10-2018-0075899 filed with the Korean Intellectual Property Office on Jun. 29, 2018, the entire contents of which are incorporated herein by reference.

FIELD OF THE INVENTION

The present invention relates to a polarizing plate, a liquid crystal panel, and a display device.

BACKGROUND OF THE INVENTION

A liquid crystal display device is a display visualizing polarization by a switching effect of a liquid crystal, and has been used in various categories ranging from small and medium displays, such as a computer, a laptop, an electronic watch, and a mobile terminal device, to a large-scale TV.

Currently, as a considerable number of polarizing plates mass-produced and commercialized for display devices, those obtained by joining a protective film which is optically transparent and has mechanical strength onto both surfaces or one surface of a polarizing film (polarizer) formed by coloring a dichromatic material such as iodine or a dichroic dye on a polyvinyl alcohol-based film, followed by cross-linking by a boron compound and stretching and aligning, have been used.

However, the stretched polyvinyl alcohol-based film has a problem in that shrinkage deformation easily occurs under a durability condition such as high temperature and high humidity. When the polarizer is deformed, the problems occur in that stress thereof affects the protective film and the liquid crystal and causes bending, and as a result, it leads to problems such as a change in physical properties of the polarizing plate including the polarizer and an occurrence of a light leakage phenomenon in a liquid crystal display device.

BRIEF SUMMARY OF THE INVENTION

The present invention provides a polarizing plate which can control a heat shrinkage rate of detail layers and the like, realize a stable internal structure while having a good bending balance and thus prevent cracks, and further, prevent a light leakage phenomenon in a liquid crystal display device.

The present invention also provides a liquid crystal panel and a display device including the above-mentioned polarizing plate.

One aspect of the present invention provides a polarizing plate including a polarizer, and a hard coating layer having a thickness of 10 µm or less and a light-transmitting substrate which are positioned so as to face each other on the basis of the polarizer.

Another aspect of the present invention provides a polarizing plate including a polarizer, and a hard coating layer having a thickness of 10 µm or less and a light-transmitting substrate which are positioned so as to face each other on the basis of the polarizer, wherein a ratio of heat shrinkage force in two directions perpendicular to each other in the light-transmitting substrate is in a specific range.

Still another aspect of the present invention provides a polarizing plate including a polarizer, and a hard coating layer having a thickness of 10 µm or less and a light-transmitting substrate which are positioned so as to face each other on the basis of the polarizer, wherein a ratio of the heat shrinkage force in the second direction of the light-transmitting substrate perpendicular to the first direction to the heat shrinkage force in the first direction of the light-transmitting substrate in a temperature range of 60° C. to 100° C. is 0.6 to 1.5.

Still another aspect of the present invention provides a liquid crystal panel wherein the polarizing plate is formed on at least one surface of the liquid crystal cell.

A further aspect of the present invention provides a display device including the above-mentioned polarizing plate.

DETAILED DESCRIPTION OF THE INVENTION

Hereinafter, the polarizing plate, the liquid crystal panel, and the display device according to specific embodiments of the present invention will be described in more detail.

As used herein, terms such as first, second, and the like may be used to describe various components, and the terms are used only to discriminate one component from another component.

Also, the (meth)acryl refers to including both acryl and methacryl.

Further, hollow inorganic nanoparticles refer to particles in which empty space is present on the surface and/or inside of the inorganic nanoparticles.

In addition, the (co)polymer refers to including both a co-polymer and a homo-polymer.

According to one embodiment of the invention, a polarizing plate including a polarizer, and a hard coating layer having a thickness of 10 µm or less and a light-transmitting substrate which are positioned so as to face each other on the basis of the polarizer can be provided, wherein a ratio of a heat shrinkage force in a second direction of the light-transmitting substrate perpendicular to a first direction to a heat shrinkage force in the first direction of the light-transmitting substrate in a temperature range of 60° C. to 100° C. is 0.6 to 1.5.

A triacetyl cellulose (TAC) film, which is frequently used as a polarizer protective film of a polarizing plate, is weak in water resistance and thus can be warped in a high temperature/high humidity environment, and causes defects such as light leakage, whereas the present inventors found through experiments that as the polarizing plate of the embodiment uses a light-transmitting substrate having the above-mentioned characteristics, it is possible to secure durability without a significant change in physical properties or form even if exposed for a long time under high temperature and high humidity conditions, thereby completing the present invention.

As the polarizing plate of the embodiment includes a light-transmitting substrate satisfying the condition in which a ratio of the heat shrinkage force in the second direction of the light-transmitting substrate perpendicular to the first direction to the heat shrinkage force in the first direction of the light-transmitting substrate in the temperature range of 60° C. to 100° C. is 0.6 to 1.5, 0.7 to 1.3, 0.8 to 1.2, or 0.9 to 1.1, it was confirmed that the polarizing plate can control a heat shrinkage rate between detail layers and the like even when a temperature of 60° C. or higher is applied during the manufacturing process and has a good bending balance, and further that the polarizing plate can prevent cracks in the polarizing plate and prevent occurrence of a light leakage phenomenon in the liquid crystal display.

More specifically, as the light-transmitting substrate satisfies the condition in which a ratio of the heat shrinkage force in the second direction of the light-transmitting substrate perpendicular to the first direction to the heat shrinkage force in the first direction of the light-transmitting substrate in the temperature range of 60° C. to 100° C. is 0.6 to 1.5, 0.7 to 1.3, 0.8 to 1.2, or 0.9 to 1.1, stress transmission under high temperature and high humidity is uniformly propagated and thus a deviation of the polarizing plate is improved, and an adhesive force between detail layers can be further improved to be robust.

In contrast, when the ratio of the heat shrinkage force in the second direction of the light-transmitting substrate perpendicular to the first direction to the heat shrinkage force in the first direction of the light-transmitting substrate in the temperature range of 60° C. to 100° C. is too small, stress transmission under high temperature and high humidity occurs nonuniformly, an adhesive force between detail layers decreases, cracks occur in the polarizing plate, and a light leakage phenomenon of the liquid crystal display device may appear.

Further, when the ratio of the heat shrinkage force in the second direction of the light-transmitting substrate perpendicular to the first direction to the heat shrinkage force in the first direction of the light-transmitting substrate in the temperature range of 60° C. to 100° C. is too high, stress transmission under high temperature and high humidity occurs nonuniformly, an adhesive force between detail layers decreases, cracks occur in the polarizing plate, and a light leakage phenomenon of the liquid crystal display device appears, which may be technically disadvantageous.

On the other hand, as described above, in the light-transmitting substrate, the ratio of the heat shrinkage force in the second direction of the light-transmitting substrate perpendicular to the first direction to the heat shrinkage force in the first direction of the light-transmitting substrate in the temperature range of 60° C. to 100° C. may be 0.6 to 1.5. Depending on factors such as the thickness of the light-transmitting substrate and modulus in each direction, the ratio of the heat shrinkage rate in the second direction of the light-transmitting substrate perpendicular to the first direction to the heat shrinkage rate in the first direction of the light-transmitting substrate in the temperature range of 60° C. to 100° C. may be 0.4 to 4, or 0.8 to 2.

As the ratio of the heat shrinkage rate in the second direction of the light-transmitting substrate perpendicular to the first direction to the heat shrinkage rate in the first direction of the light-transmitting substrate in the temperature range of 60° C. to 100° C. is 0.4 to 4, or 0.8 to 2, in the polarizing plate including the light-transmitting substrate, even when a temperature of 60° C. or higher is applied in the manufacturing process, variations in the heat shrinkage rate between detail layers is not very large, and thus a bending balance of the polarizing plate is improved, and cracks of the polarizing plate and a light leakage phenomenon of the liquid crystal display device can be prevented.

When the ratio of the heat shrinkage rate in the second direction of the light-transmitting substrate perpendicular to the first direction to the heat shrinkage rate in the first direction of the light-transmitting substrate in the temperature range of 60° C. to 100° C. is too small, stress transmission under high temperature and high humidity occurs nonuniformly, an adhesive force between detail layers decreases, cracks occur in the polarizing plate, and a light leakage phenomenon of the liquid crystal display device may appear.

When the ratio of the heat shrinkage rate in the second direction of the light-transmitting substrate perpendicular to the first direction to the heat shrinkage rate in the first direction of the light-transmitting substrate in the temperature range of 60° C. to 100° C. is too high, for example, when the ratio is greater than 4, stress transmission under high temperature and high humidity occurs nonuniformly, an adhesive force between detail layers decreases, cracks occur in the polarizing plate, and a light leakage phenomenon of the liquid crystal display device appears, which may be technically disadvantageous.

Each of the heat shrinkage force in the first direction and the heat shrinkage force in the second direction of the light-transmitting substrate may be measured by exposing it to a temperature of 60° C. to 100° C. for 10 to 300 minutes.

Each of the heat shrinkage rate in the first direction and the heat shrinkage rate in the second direction of the light-transmitting substrate may be measured by exposing it to a temperature of 60° C. to 100° C. for 10 to 100 minutes.

The first direction of the light-transmitting substrate is an MD direction (machine direction) of the light-transmitting substrate, and the second direction of the light-transmitting substrate may be a TD direction (transverse direction) of the light-transmitting substrate.

The light-transmitting substrate may have transmittance of 50% or more at a wavelength of 300 nm or more.

In addition, the polarizing plate of the embodiment includes a light-transmitting substrate that satisfies the conditions related to the ratio of the heat shrinkage force or the heat shrinkage rate between the first direction and the second direction of the light-transmitting substrate in the temperature range of 60° C. to 100° C., and simultaneously includes a hard coating layer having a thickness of 10 μm or less on the opposite surface to the light-transmitting substrate of the polarizing plate, and therefore, the heat shrinkage rate and heat shrinkage force between detail layers can be properly adjusted while achieving a thinner thickness, and a robust internal structure can be realized.

In particular, previously known polarizing plates have a structure in which a triacetyl cellulose (TAC) film, etc. is positioned on both sides on the basis of the polarizer, whereas the polarizing plate of one embodiment of the invention has a structure in which a light-transmitting substrate having the above-described characteristics is located on one side and a hard coating layer having a thickness of 10 μm or less is located on the other side, and thus, moisture transmission toward the PVA film can be blocked, and the entire thickness of the polarizing film can be reduced.

Figure 1:
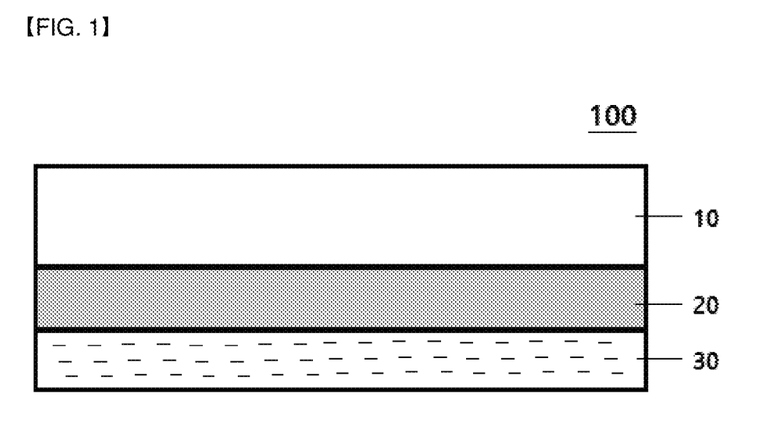
FIG. 1 shows an example of a polarizing plate of an embodiment of the invention.

An example of the polarizing plate 100 of the embodiment is shown in FIG. 1. The polarizing plate 100 shown in FIG. 1 includes a polarizer 20, and a hard coating layer 30 having a thickness of 10 μm or less and a light-transmitting substrate 10 which are positioned so as to face each other on the basis of the polarizer.

In addition, the light-transmitting substrate may have a thickness direction retardation (Rth) measured at a wavelength of 400 nm to 800 nm of 3000 nm or more.

By controlling the retardation of the light-transmitting substrate to 3000 nm or more, 4000 to 15,000 nm, or 5000 to 10,000 nm, a rainbow phenomenon due to destructive interference is suppressed, and the visibility of an image display device can be improved to similar to that of the cellulose ester-based film.

The retardation can be calculated by substituting a refractive index in the slow axis direction ($n_x$) which is the direction with the highest refractive index in the plane of the light-transmitting substrate, a refractive index in the fast axis direction ($n_y$) which is a direction orthogonal to the slow axis direction, and a thickness d (unit: nm) of the light-transmitting substrate into the following Equation 1.

$$Re = (n_x - n_y) \times d \qquad \text{[Equation 1]}$$

In addition, such retardation may be, for example, a value measured with the use of an automatic double refraction meter (KOBRA-WR, measurement angle: 0°, measurement wavelength: 548.2 nm). Alternatively, the retardation can be measured by the following method. First, the alignment axis direction of the light-transmitting substrate is determined using two polarizing plates, and refractive indices nx and ny of two axes orthogonal to the alignment direction are determined by an Abbe refractometer (NAR-4T). In this case, an axis showing a larger refractive index is defined as a slow axis. In addition, the thickness of the light-transmitting substrate is measured using, for example, an electric micrometer, and the refractive index difference $n_x - n_y$ (hereinafter, $n_x - n_y$ is referred to as $\Delta n$) is calculated using the refractive index obtained above. The retardation can also be calculated from the product of the refractive index difference $\Delta n$ and the thickness d (nm) of a light-transmitting substrate.

Since the retardation of the light-transmitting substrate is 3000 nm or more, the refractive index difference $\Delta n$ may be 0.05 or more, 0.05 to 0.20, or 0.08 to 0.13. When the refractive index difference $\Delta n$ is less than 0.05, the thickness of the light-transmitting substrate necessary for obtaining the retardation value described above may be increased. Meanwhile, when the refractive index difference $\Delta n$ exceeds 0.20, the necessity of excessively increasing the stretch ratio occurs, and thus the light-transmitting substrate is likely to be torn and broken, the practicality as an industrial material may be remarkably lowered, and the resistance to moisture and heat may be lowered.

The refractive index ($n_x$) in the slow axis direction of the light-transmitting substrate may be 1.60 to 1.80, or 1.65 to 1.75. Meanwhile, the refractive index ($n_y$) in the fast axis direction of the light-transmitting substrate having the above-mentioned in-plane birefringence may be 1.50 to 1.70, or 1.55 to 1.65.

Further, as the light-transmitting substrate, a polyethylene terephthalate (PET) film having excellent water resistance, having almost no possibility of inducing a light leakage phenomenon, and having excellent mechanical properties can be used.

Meanwhile, the light-transmitting substrate may have low moisture permeation characteristics while having thickness direction retardation (Rth) measured at a wavelength 400 nm to 800 nm of 3000 nm or more. More specifically, the light-transmitting substrate may have a moisture permeation amount of 100 g/m² or less, or 10 to 100 g/m², when the moisture permeation amount is measured for 24 hours under the conditions of 40° C. and 100% humidity.

The thickness of the light-transmitting substrate is not particularly limited, but may be 10 to 150 μm, 20 to 120 μm, or 30 to 100 μm. When the thickness of the light-transmitting substrate is less than 10 μm, the thickness of the hard coating layer may be excessively thin so that bending occurs, the flexibility of the light-transmitting substrate decreases, and it may be difficult to control the process. In addition, when the light-transmitting substrate is excessively thick, the transmittance of the light-transmitting substrate is decreased, the optical properties may be reduced, and it is difficult to reduce the thickness of the image display device including the same.

In order to prevent the phenomenon in which the internal structure of the polarizing plate is more robust and bending occurs even when exposed to high-temperature conditions, the ratio of the thickness of the hard coating layer to the thickness of the light-transmitting substrate may be 0.02 to 0.25.

As described above, if the thickness of the light-transmitting substrate does not have an appropriate range compared to the thickness of the hard coating layer, the polarizing plate can be bent, the flexibility of the light-transmitting substrate is reduced, and it may be difficult to control the process.

On the other hand, the polarizing plate of the embodiment includes a light-transmitting substrate satisfying the conditions in which the ratio of the heat shrinkage force in the second direction of the light-transmitting substrate perpendicular to the first direction to the heat shrinkage force in the first direction of the light-transmitting substrate in the temperature range of 60° C. to 100° C. is 0.6 to 1.5, 0.7 to 1.3, 0.8 to 1.2, or 0.9 to 1.1, and simultaneously includes a hard coating layer having a thickness of 10 μm or less, and therefore, a more robust structure can be realized even by a thinner thickness compared to other polarizer structures previously known, and it may have a characteristic that the durability or physical properties do not significantly change due to external heat. In addition, as described above, the ratio of the heat shrinkage rate in the second direction of the light-transmitting substrate perpendicular to the first direction to the heat shrinkage rate in the first direction of the light-transmitting substrate in the temperature range of 60° C. to 100° C. may be 0.4 to 4, or 0.8 to 2.

More specifically, the thickness of the polarizer plus the hard coating layer plus the light-transmitting substrate may be 200 μm or less. For example, the polarizer may have a thickness of 40 μm or less, or 1 to 40 μm, the hard coating layer may have a thickness of 10 μm or less, or 1 to 10 μm, and the light-transmitting substrate may have a thickness of 150 μm or less.

A specific composition of the hard coating layer is not particularly limited, but for example, the hard coating layer may include: a binder resin; and organic fine particles having a particle size of 0.5 μm to 10 μm, or inorganic fine particles having a particle size of 1 nm to 500 nm, dispersed in the binder resin.

The binder resin contained in the hard coating layer may include a photocurable resin. The photocurable resin refers to a polymer of a photopolymerizable compound which can cause a polymerization reaction when irradiated with light such as ultraviolet light.

Examples of the photocurable resin may include: a polymer or a copolymer formed from the group consisting of a reactive acrylate oligomer group including a urethane acrylate oligomer, an epoxide acrylate oligomer, a polyester acrylate, and a polyether acrylate; and a polyfunctional acrylate monomer group including dipentaerythritol hexaacrylate, dipentaerythritol pentaacrylate, pentaerythritol tetraacrylate, pentaerythritol triacrylate, trimethylolpropane triacrylate, glycerol propoxylate triacrylate, trimethylolpropane ethoxylate triacrylate, trimethylpropyl triacrylate, 1,6-hexanediol diacrylate, tripropylene glycol diacrylate, and ethylene glycol diacrylate, or an epoxy resin containing an epoxy group including an epoxy group, an alicyclic epoxy group, a glycidyl group epoxy group, an oxetane group, etc.

The binder resin may further include a (co)polymer (hereinafter referred to as a high molecular weight (co) polymer) having a weight average molecular weight of 10,000 g/mol or more together with the above-described photocurable resin. The high molecular weight (co)polymer may include, for example, one or more polymers selected from the group consisting of cellulose-based polymers, acrylic-based polymers, styrene-based polymers, epoxide-based polymers, nylon-based polymers, urethane-based polymers, and polyolefin-based polymers.

The organic or inorganic fine particles are not particularly limited in terms of particle sizes, but for example, the organic fine particles may have a particle size of 1 to 10 μm, and the inorganic particles may have a particle size of 1 nm to 500 nm, or 1 nm to 300 nm.

In addition, specific examples of the organic or inorganic fine particles included in the hard coating layer are not limited, but for example, the organic or inorganic fine particles may be organic fine particles including an acrylic-based resin, a styrene-based resin, an epoxide resin, and a nylon resin, or inorganic fine particles including a silicon oxide, titanium dioxide, an indium oxide, a tin oxide, a zirconium oxide, and a zinc oxide.

The polarizing plate of the embodiment includes a polarizer.

As the polarizer, a polarizer that is well-known in the art, for example, a film composed of polyvinyl alcohol (PVA) containing iodine or a dichroic dye, can be used. In this case, the polarizer may be produced by dyeing iodine or a dichroic dye on a polyvinyl alcohol film and stretching it, but the production method thereof is not particularly limited.

Meanwhile, when the polarizer is a polyvinyl alcohol film, the polyvinyl alcohol film may be used without particular limitation as long as it includes a polyvinyl alcohol resin or a derivative thereof. At this time, examples of the derivative of the polyvinyl alcohol resin include, but are not limited to, a polyvinyl formal resin, a polyvinyl acetal resin, and the like. Alternatively, the polyvinyl alcohol film may be a commercially available polyvinyl alcohol film generally used in the manufacture of polarizers in the art, and examples thereof include P30, PE30, and PE60 (available from Kuraray Co., Ltd.), and M3000 and M6000 (available from Nippon Synthetic Chemical Industry Co., Ltd.).

Meanwhile, the polyvinyl alcohol film may have a degree of polymerization of 1000 to 10,000 or 1500 to 5000, but is not limited thereto. When the degree of polymerization satisfies the above range, molecules may freely move and may be smoothly mixed with iodine or a dichroic dye, etc. In addition, the polarizer may have a thickness of 40 μm or less, 30 μm or less, 20 μm or less, 1 to 20 μm, or 1 to 10 μm. In this case, a device such as a polarizing plate or an image display device including the polarizer can be made small in thickness and light in weight.

The polarizing plate may further include an anti-reflection film formed on one surface of the light-transmitting substrate so as to oppose the polarizer.

Figure 2:
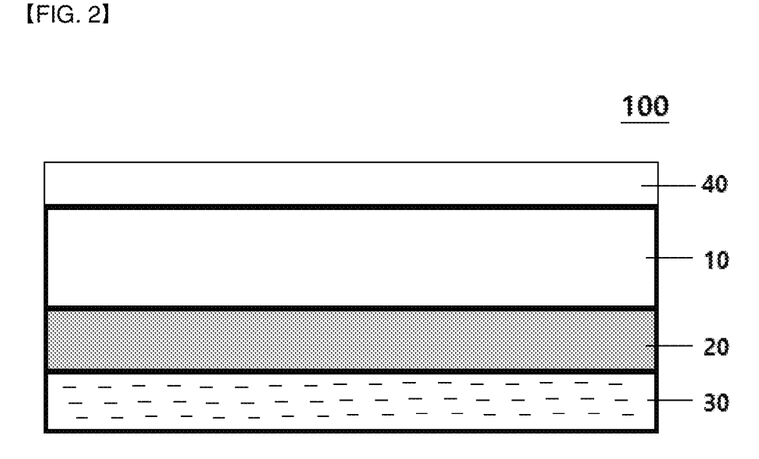
FIG. 2 shows another example of a polarizing plate of an embodiment of the invention.

Another example of the polarizing plate 100 of the embodiment is shown in FIG. 2. The polarizing plate 100 shown in FIG. 2 includes a polarizer 20 and a hard coating layer 30 having a thickness of 10 μm or less, and a light-transmitting substrate 10 which are positioned so as to face each other on the basis of the polarizer, wherein the polarizing plate includes an anti-reflection film 40 formed on one surface of the light-transmitting substrate 10.

The anti-reflection film may have average reflectance of 2% or less in a wavelength range of 380 nm to 780 nm.

The anti-reflection film may include a hard coating layer having a thickness of 1 to 100 μm and a low reflection layer having a refractive index of 1.20 to 1.60 in a wavelength region of 380 nm to 780 nm.

Specific examples of the hard coating layer included in the anti-reflection film are not limited, but the hard coating layer included in the anti-reflection film may include: a binder resin; and organic fine particles having a particle size of 0.5 μm to 10 μm, or inorganic fine particles having a particle size of 1 nm to 500 nm dispersed in the binder resin, similar to "the hard coating layer having a thickness of 10 μm or less positioned so as to face on the basis of the polarizer".

The detailed description of the binder resin and the organic fine particles having a particle size of 0.5 μm to 10 μm or the inorganic fine particles having a particle size of 1 nm to 500 nm contained in the hard coating layer included in the anti-reflection film includes the contents described above.

The low reflection layer having a refractive index of 1.20 to 1.60 in the wavelength region of 380 nm to 780 nm may include a binder resin and organic fine particles or inorganic fine particles dispersed in the binder resin, and optionally, it may further include a fluorine-containing compound having a photoreactive functional group and/or a silicon-based compound having a photoreactive functional group.

The binder resin includes a (co)polymer containing a polyfunctional (meth)acrylate-based repeating unit, wherein the repeating unit may be derived from polyfunctional (meth)acrylate-based compounds, such as trimethylolpropane triacrylate (TMPTA), trimethylolpropane ethoxy triacrylate (TMPEOTA), glycerin propoxylate triacrylate (GPTA), pentaerythritol tetraacrylate (PETA), and pentaerythritol hexaacrylate (DPHA).

The photoreactive functional group contained in the fluorine-containing compound or silicon-based compound may be at least one functional group selected from the group consisting of a (meth)acrylate group, an epoxide group, a vinyl group, and a thiol group.

The fluorine-containing compound containing a photoreactive functional group may be at least one compound selected from the group consisting of: i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer in which at least one photoreactive functional group is substituted and at least one fluorine is substituted on at least one silicon; and iv) a polyether compound in which at least one photoreactive functional group is substituted and at least one hydrogen is substituted with fluorine.

The low reflection layer may also include hollow inorganic nanoparticles, solid inorganic nanoparticles, and/or porous inorganic nanoparticles.

The hollow inorganic nanoparticles refer to particles having a maximum diameter of less than 200 nm, and a shape in which empty space is present on the surface and/or inside thereof. The hollow inorganic nanoparticles may include at least one selected from the group consisting of inorganic fine particles having a number average particle size of 1 to 200 nm, or 10 to 100 nm. In addition, the hollow inorganic nanoparticles may have a density of 1.50 g/cm$^3$ to 3.50 g/cm$^3$.

The hollow inorganic nanoparticles may contain at least one reactive functional group selected from the group consisting of a (meth)acrylate group, an epoxide group, a vinyl group, and a thiol group on a surface thereof. As the above-mentioned reactive functional group is contained on the surface of the hollow inorganic nanoparticles, it is possible to have a higher degree of crosslinking.

The solid inorganic nanoparticles may include at least one selected from the group consisting of solid inorganic fine particles having a number average particle size of 0.5 to 100 nm.

The porous inorganic nanoparticles may include at least one selected from the group consisting of inorganic fine particles having a number average particle size of 0.5 to 100 nm.

The low reflection layer may include: 10 to 400 parts by weight of the inorganic nanoparticles; and 20 to 300 parts by weight of a fluorine-containing compound and/or a silicon-based compound including the photoreactive functional group, based on 100 parts by weight of the (co)polymer.

The polarizing plate may further include an adhesive layer disposed between the polarizer and the light-transmitting substrate and having a thickness of 0.1 μm to 5 μm.

In the adhesive layer, various adhesives for polarizing plates used in the art, for example, polyvinyl alcohol-based adhesives, polyurethane-based adhesives, acrylic-based adhesives, and cationic or radical-based adhesives may be used as the adhesive without limitation.

The polarizing plate may further include a cohesive layer formed on the other surface of the hard coating film coming into contact with the polarizer.

The cohesive layer may enable attachment of the polarizing plate of the embodiment and the image panel of the image display device. The cohesive layer may be formed using various adhesives that are well-known in the art, and the kind thereof is not particularly limited. For example, the cohesive layer may be formed using a rubber-based adhesive, an acrylic-based adhesive, a silicone-based adhesive, a urethane-based adhesive, a polyvinyl alcohol-based adhesive, a polyvinylpyrrolidone-based adhesive, a polyacrylamide-based adhesive, a cellulose-based adhesive, a vinyl alkyl ether-based adhesive, or the like.

Figure 3:
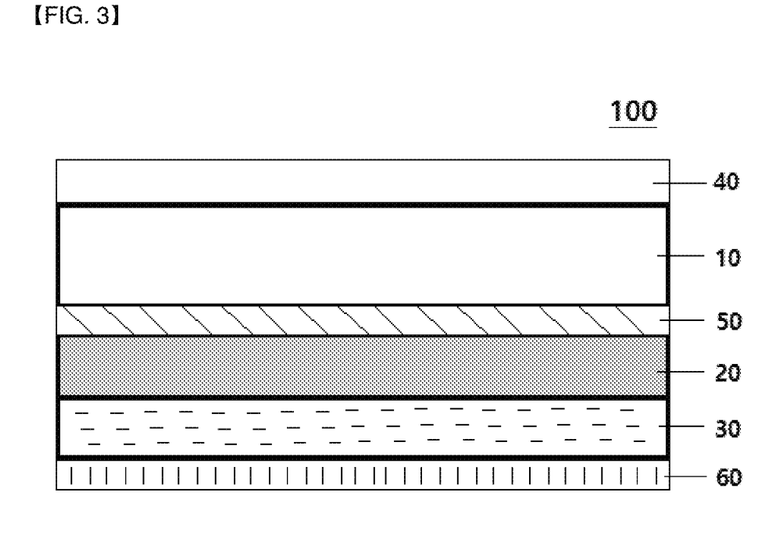
FIG. 3 shows another example of a polarizing plate of an embodiment of the invention.

Another example of the polarizing plate 100 of the embodiment is shown in FIG. 3. The polarizing plate 100 shown in FIG. 3 includes a polarizer 20 and a hard coating layer 30 having a thickness of 10 μm or less and a light-transmitting substrate 10 which are positioned so as to face each other on the basis of the polarizer, wherein the polarizing plate includes an anti-reflection film 40 formed on one surface of the light-transmitting substrate 10, and wherein the polarizing plate includes an adhesive layer 50 positioned between the polarizer and the light-transmitting substrate and a cohesive layer 60 formed on the other surface of the hard coating film coming into contact with the polarizer.

The thickness of the cohesive layer is not particularly limited, and for example, the cohesive layer may have a thickness of 1 to 50 μm.

According to another embodiment of the invention, a liquid crystal panel in which a polarizing plate is formed on at least one surface of a liquid crystal cell can be provided.

Figure 4:
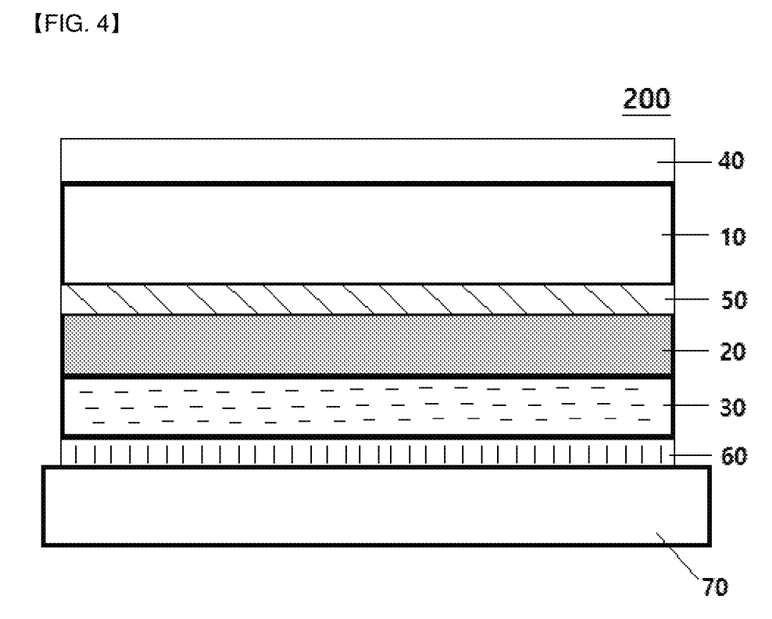
FIG. 4 shows an example of a liquid crystal panel of an embodiment of the invention.

An example of a liquid crystal panel 200 of the embodiment is shown in FIG. 4. The liquid crystal panel 200 shown in FIG. 4 has a structure in which the polarizing plate is formed on one surface of the liquid crystal cell 70.

Figure 5:
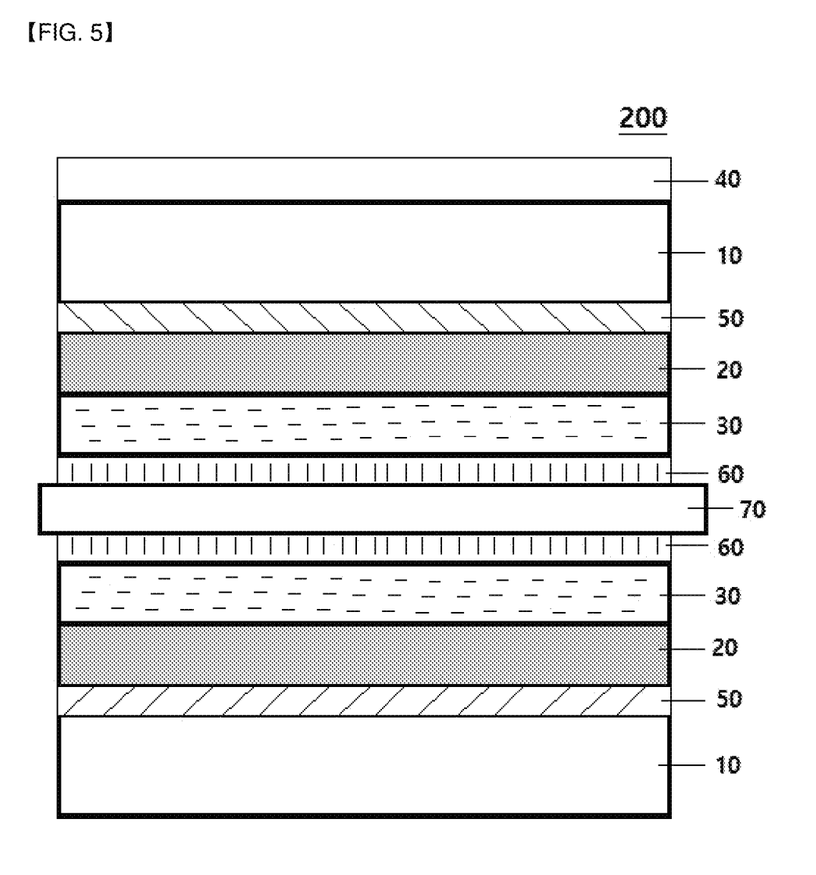
FIG. 5 shows another example of a liquid crystal panel of an embodiment of the invention.

In addition, still another example of the liquid crystal panel 200 of the embodiment is shown in FIG. 5. The liquid crystal panel 200 shown in FIG. 5 has a structure in which the polarizing plate is formed on both surfaces of the liquid crystal cell 70.

In the liquid crystal panel, the polarizing plates may be respectively formed on opposite surfaces of the liquid crystal cell, wherein the two polarizing plates may be positioned such that the MD direction of the polarizer of the polarizing plate formed on one surface of the liquid crystal cell and the MD direction of the polarizer of the polarizing plate formed on the other surface are perpendicular to each other.

According to still another embodiment of the invention, a display device including the polarizing plate described above can be provided.

Specific examples of the display device are not limited, and for example, it may be a device such as a liquid crystal display, a plasma display, or an organic light emitting diode.

As one example, the display device may be a liquid crystal display device including: a pair of polarizing plates opposing each other; a thin film transistor, a color filter, and a liquid crystal cell which are sequentially stacked between the pair of polarizing plates; and a backlight unit.

In the display device, the anti-reflection film may be provided on the outermost surface of a display panel at an observer side or a backlight side.

In the display device including the anti-reflection film, the anti-reflection film may be positioned on one surface of the polarizing plate that is relatively far from the backlight unit among the pair of polarizing plates.

In still another example, the display device may include: a display panel; and the polarizing plate positioned on at least one surface of the display panel.

The display device may be a liquid crystal display device including a liquid crystal panel and a light laminated body provided on both surfaces of the liquid crystal panel, wherein at least one of the polarizing plates may be a polarizing plate including a polarizer according to one embodiment of the present invention described above.

In this case, the kind of the liquid crystal panel included in the liquid crystal display device is not particularly limited, but for example, a known panel such as a passive matrix-type panel such as a twisted nematic (TN), super twisted nematic (STN), ferroelectric (F), or polymer dispersed (PD) panel; an active matrix-type panel such as a two or three terminal panel, an in-plane switching (IPS) panel, or a vertical alignment (VA) panel may be applied as the liquid crystal panel.

Advantageous Effects

According to the present invention, a polarizing plate which can control a heat shrinkage rate of detailed constituent layers, realize a stable internal structure while having a good bending balance and thus prevent cracks, and further, prevent a light leakage phenomenon in a liquid crystal display device, a liquid crystal panel, and a display device including the above-mentioned polarizing plate can be provided.

DETAILED DESCRIPTION OF THE EMBODIMENTS

Hereinafter, embodiments of the present invention are described in further detail with reference to examples. However, these examples are for illustrative purposes only and are not intended to limit the scope of the present invention.

PREPARATION EXAMPLE

Preparation Example 1: Preparation of Anti-Reflection Film (1) Preparation of Coating Liquid for Forming a Hard Coating Layer of an Anti-Reflection Film The components shown in Table 1 were mixed to prepare a coating liquid (B1, B2, and B3) for forming a hard coating layer of the anti-reflection film.

TABLE 1

| (Unit: g) | B1 | B2 | B3 |
|---|---|---|---|
| DPHA |  | 6.237 |  |
| PETA | 16.421 | 10.728 | 13.413 |
| UA-306T | 3.079 | 2.069 | 6.114 |
| 8BR-500 | 6.158 | 6.537 | 6.114 |
| IRG-184 | 1.026 | 1.023 | 1.026 |
| Tego-270 | 0.051 | 0.051 | 0.051 |
| BYK350 | 0.051 | 0.051 | 0.051 |
| 2-butanol | 25.92 | 32.80 | 36.10 |
| IPA | 45.92 | 38.80 | 35.70 |
| XX-103BQ (2.0 µm, RI 1.515) | 0.318 | 0.460 | 0.600 |
| XX-113BQ (2.0 µm, RI 1.555) | 0.708 | 0.563 | 0.300 |
| MA-ST (30% in MeOH) | 0.342 | 0.682 | 0.542 |

DPHA: dipentaerythritol hexaacrylate
PETA: pentaerythritol triacrylate
UA-306T: urethane acrylate, reaction product of toluene diisocyanate and pentaerythritol triacrylate (Kyoeisha Chemical)
8BR-500: photocurable urethane acrylate polymer (Mw 200,000, Taisei Fine Chemical)
IRG-184: initiator (Irgacure 184, Ciba Specialty Chemicals)
Tego-270: leveling agent (Tego company)
BYK350: leveling agent (BYK-Chemie)
IPA: isopropyl alcohol
XX-103BQ (2.0 µm, Refractive index 1.515): copolymerized particles of polystyrene and polymethyl methacrylate (Sekisui Plastics)
XX-113BQ (2.0 µm, Refractive index 1.555): copolymerized particles of polystyrene and polymethyl methacrylate (Sekisui Plastics)
MA-ST (30% in MeOH): Dispersion in which silica nanoparticles with a size of 10~15 nm are dispersed in methyl alcohol (Nissan Chemical)

(2) Preparation of Coating Liquid (C) for Forming Low Reflection Layer 100 g of trimethylolpropane triacrylate (TMPTA), 283 g of hollow silica nanoparticles (diameter range: about 42 nm to 66 nm, JSC Catalyst and Chemicals), 59 g of solid silica nanoparticles (diameter range: about 12 nm to 19 nm), 115 g of a first fluorine-containing compound (X-71-1203M, ShinEtsu), 15.5 g of a second fluorine-containing compound (RS-537, DIC Corporation) and 10 g of an initiator (Irgacure 127, Ciba) were diluted in a MIBK (methyl isobutyl ketone) solvent so as to have a solid content of 3% by weight, thereby preparing a coating liquid for forming a low reflection layer.

(3) Preparation of Anti-Reflection Film Formed on the Light-Transmitting Substrate Each of the prepared coating liquids for forming a hard coating layer (B1, B2, and B3) was coated onto the respective polyethylene terephthalate (PET) films shown in Tables 2 and 3 below using a #12 Mayer bar, then dried at the temperature shown in Tables 2 and 3 below for 2 minutes, and UV-cured to form a hard coating layer (coating thickness of 5 µm). An H bulb was used as a UV lamp and curing a reaction was performed under a nitrogen atmosphere. The amount of UV light irradiated upon curing was 100 mJ/cm$^2$.

The coating liquid (C) for forming the low reflection layer was coated onto the hard coating film using a #4 Mayer bar so that the thickness was about 110 to 120 nm, and then dried and cured for 1 minute at the temperature shown in Tables 2 and 3 below. During the curing, the dried coating was irradiated with ultraviolet light of 252 mJ/cm$^2$ under a nitrogen purge.

Preparation Example 2: Preparation of Coating Liquid for Forming Hard Coating Layer and Preparation of Polarizer with Hard Coating Layer Formed Thereon (1) Preparation of Coating Liquid (A) for Forming Hard Coating Layer 28 g of trimethylolpropane triacrylate, 2 g of KBE-403, 0.1 g of an initiator KIP-100f, and 0.06 g of a leveling agent (Tego wet 270) were uniformly mixed to prepare a hard coating composition.

(2) Preparation of Polarizer with Hard Coating Layer Formed Thereon

A polyvinyl alcohol polarizer (thickness: 25 µm, manufacturer: LG Chem) was bonded onto the light-transmitting substrate side of the anti-reflection film prepared in Preparation Example 1 using a UV adhesive, then the coating liquid (A) for forming the hard coating layer was coated onto the opposite side of the light-transmitting substrate to a thickness of 7 µm, and the dried coating was irradiated with ultraviolet light of 500 mJ/cm$^2$ under nitrogen purge to form a hard coating layer.

Examples and Comparative Examples: Preparation of Polarizing Plate and Liquid Crystal Panel (1) Preparation of Polarizing Plate The anti-reflection film formed on the light-transmitting substrate obtained in Preparation Example 1 and the polarizer were joined using a UV-curable adhesive, and then a hard coating layer prepared in Preparation Example 2 was formed on the other side of the polarizer to prepare the polarizing plate of each of the examples and comparative examples described in Table 2 and Table 3 below.

1) Measurement of the Ratio of Heat Shrinkage Force

In this case, the ratio of heat shrinkage force in the MD direction: heat shrinkage force in the TD direction of the polyethylene terephthalate (PET) film used in each of the examples and comparative examples was measured using a DMA instrument (dynamic mechanical analyzer) (TA Instruments).

The temperature was set to increase by 25° C. per minute from 25° C. and then reach 75° C. after 3 minutes, and then the temperature was set to reach 80° C. after 7 minutes. The measurement time was 2 hours. The values of the heat shrinkage force in the MD direction and the heat shrinkage force in the TD direction of the PET film after 2 hours were measured 2 hours after stabilization at 80° C.

The heat shrinkage force in the MD direction and the heat shrinkage force in the TD direction of the PET film were respectively determined by fastening a sample cut into a width of 6 mm and a length of 50 mm to a clamp and then pulling and fixing the sample so as to maintain 0.1% of strain in the 0.01 N preload state, and then measuring the shrinkage force required to maintain 0.1% of strain at a high temperature. The heat shrinkage force in the MD direction and the heat shrinkage force in the TD direction of the PET film were respectively measured and their ratios were determined.

PET1: shrinkage force ratio (MD:TD) is about 1
PET2: shrinkage force ratio (MD:TD) is about 2
PET3: shrinkage force ratio (MD:TD) is about 0.5

2) Determination of the Ratio of Heat Shrinkage Rate

The ratio of a heat shrinkage rate in the MD direction: a heat shrinkage rate in the TD direction of the polyethylene terephthalate (PET) film used in each of the examples and comparative examples was calculated by cutting each PET film into a size of 10 cm*10 cm (width*length), allowing to stand at 80° C. for 30 minutes, and then determining the shrinkage rate (modified length/initial length) in each of the MD and TD directions.

PET 1: The ratio of heat shrinkage ratio (MD:TD) is about 1
PET 2: The ratio of heat shrinkage rate (MD:TD) is about 14
PET 3: The ratio of heat shrinkage rate (MD:TD) is about 5

(2) Preparation of Sample for Thermal Shock Evaluation

The polarizing plate cut into a square where the length of one side was 10 cm was bonded to one surface of the glass for TV (12 cm wide, 12 cm long, and 0.7 mm thick) to prepare a sample for thermal shock evaluation. At this time, the polarizing plate was cut so that the MD direction of the polarizer was parallel to one side of the square.

Experimental Example: Thermal Shock Evaluation

For the prepared polarizing plate and a sample for evaluation to which the polarizing plate was joined, the thermal shock test was conducted under the following conditions and the following three items were measured and confirmed.

Measuring Conditions:

The polarizing plate and the sample for evaluation were placed vertically in a thermal shock chamber. The process in which the temperature was raised from room temperature to 80° C. and left for 30 minutes, after which the temperature was lowered to −30° C. and left for 30 minutes, and then the temperature was controlled to room temperature, was defined as 1 cycle, and a total of 100 cycles were repeated.

(1) Number of Occurrence of Cracks

The cracks occurred between the polarizers of the sample for evaluation and the gaps formed between the polarizing plates were visually confirmed, and the number of occurrences of cracks with a length of 1 cm was confirmed.

(2) Bubble

Bubbles occurring between the polarizer and the protective film of the evaluation sample and bubbles occurring between the polarizer and the hard coating layer were visually confirmed, and the number of bubbles having a diameter of 5 mm or more was confirmed.

(3) Vertex Detachment (Mm), 10×10/Film

The four vertices of the polarizing plate sample were observed, and the detachment between the coating layer and the polarizer, the peeling between the polarizer and the protective film, and the peeling and bending between the hard coating and the cohesive layer were observed. When the detachment occurred and bending appeared, the bending height from the floor in a state where the sample placed flat on the floor was measured to calculate the average height.

TABLE 2

|  |  | Ex. 1 | Ex. 2 | Ex. 3 |
|---|---|---|---|---|
| Anti-reflection film | Low reflection layer | — | Coating liquid (C) | Coating liquid (C) |
|  | Hard coating layer | B1 | B1 | B2 |
|  | Drying temperature of low reflection layer | — | 40° C. | 40° C. |
|  | Drying temperature of anti-glare layer | 60° C. | 60° C. | 60° C. |
|  | Low moisture-permeable substrate | PET 1 | PET 1 | PET 1 |
| Result of thermal shock evaluation | Number of cracks | 0 | 0 | 0 |
|  | Bubble | 0 | 0 | 0 |
|  | Vortex detachment (mm), 10 × 10/film | 0 | 0 | 0 |

TABLE 3

|  |  | Comp. Ex. 1 | Comp. Ex. 2 | Comp. Ex. 3 | Comp. Ex. 4 | Comp. Ex. 5 |
|---|---|---|---|---|---|---|
| Anti-reflection film | Low reflection layer | — | — | Coating liquid (C) | Coating liquid (C) | Coating liquid (C) |
|  | Hard coating layer | B1 | B1 | B1 | B3 | B1 |
|  | Drying temperature of low reflection layer | — | — | 40° C. | 40° C. | 40° C. |
|  | Drying temperature of anti-glare layer | 60° C. | 100° C. | 60° C. | 100° C. | 60° C. |
|  | Low moisture-permeable substrate | PET 3 | PET 3 | PET 3 | PET 3 | PET 2 |
| Result of thermal shock evaluation (10 × 10) | Number of cracks | 0 | 2 | 0 | 0 | 0 |
|  | Bubbles | 1 | 2 | 1 | 1 | 0 |
|  | Vertex detachment (mm), 10 × 10/film | 3 | 4 | 4 | 4 | 2 |

As shown in Table 1 and Table 2, it was confirmed that in the polarizing plates of the examples, even when a temperature of 60° C. or more was applied in the manufacturing process, the heat shrinkage rate between detail layers was controlled, and a bending balance of the polarizing plate was excellent. It was also confirmed that the cracks of a polarizing plate can be prevented and a light leakage phenomenon of a liquid crystal display device can be prevented.

EXPLANATION OF SIGN

10: light-transmitting substrate
20: polarizer
30: hard coating layer
40: anti-reflection film
50: adhesive layer
60: cohesive layer
70: liquid crystal cell
100: polarizer
200: liquid crystal panel

What is claimed is:

1. A polarizing plate comprising:
a polarizer,
a hard coating layer having a thickness of 1 μm to 10 μm, and a light-transmitting substrate,
wherein the hard coating layer and the light-transmitting substrate are positioned so as to face each other on the basis of the polarizer,
wherein a ratio of heat shrinkage force in a second direction of the light-transmitting substrate perpendicular to a first direction to a heat shrinkage force in the first direction of the light-transmitting substrate in a temperature range of 60° C. to 100° C. is 0.6 to 1.5,
wherein the hard coating layer contacts the polarizer,
the light-transmitting substrate is a polyethylene terephthalate film,
a thickness of the light-transmitting substrate is 10 to 150 μm, and
a ratio of the thickness of the hard coating layer to the thickness of the light-transmitting substrate is 0.02 to 0.25,
wherein the hard coating layer having a thickness of 1 μm to 10 μm includes: a binder resin; and organic or inorganic fine particles dispersed in the binder resin,
the organic fine particles have a particle size of 0.5 μm to 10 μm and the inorganic fine particles have a particle size of 1 nm to 500 nm, and
the binder resin contained in the hard coating layer includes a photocurable resin comprising a polyfunctional acrylate monomer group selected from the group consisting of pentaerythritol triacrylate, glycerol propoxylate triacrylate, trimethylolpropane ethoxylate triacrylate, trimethylpropyl triacrylate, and tripropylene glycol diacrylate,
wherein the heat shrinkage force is a force required to maintain 0.1% of strain at a temperature range of 60° C. to 100° C. after fixing the light transmitting substrate to maintain 0.1% of strain in a 0.01 N preload state,
wherein the polarizing plate further includes an anti-reflection film formed on one surface of the light-transmitting substrate so as to be placed an opposite side of the polarizer, and
wherein the anti-reflection film includes a hard coating layer having a thickness of 1 to 100 μm and a low reflection layer having a refractive index of 1.20 to 1.60 in a wavelength region of 380 nm to 780 nm.

2. The polarizing plate according to claim 1, wherein a ratio of a heat shrinkage rate in the second direction of the light-transmitting substrate perpendicular to the first direction to a heat shrinkage rate in the first direction of the light-transmitting substrate in the temperature range of 60° C. to 100° C. is 0.4 to 4.

3. The polarizing plate according to claim 2, wherein each of the heat shrinkage rate in the first direction and the heat shrinkage rate in the second direction of the light-transmitting substrate is measured by exposing the light-transmitting substrate to a temperature of 60° C. to 100° C. for 10 to 300 minutes.

4. The polarizing plate according to claim 2, wherein the first direction of the light-transmitting substrate is a machine direction (MD direction) of the light-transmitting substrate, and the second direction of the light-transmitting substrate is a transverse direction (TD direction) of the light-transmitting substrate.

5. The polarizing plate according to claim 1, wherein each of the heat shrinkage force in the first direction and the heat shrinkage force in the second direction of the light-transmitting substrate is measured by exposing the light-transmitting substrate to a temperature of 60° ° C. to 100° C. for 10 to 300 minutes.

6. The polarizing plate according to claim 1, wherein the first direction of the light-transmitting substrate is a machine direction (MD direction) of the light-transmitting substrate, and the second direction of the light-transmitting substrate is a transverse direction (TD direction) of the light-transmitting substrate.

7. The polarizing plate according to claim 1, wherein the light-transmitting substrate has a thickness direction retardation (Rth) of at least 3000 nm as measured at a wavelength of 400 nm to 800 nm.

8. The polarizing plate according to claim 1, wherein the light-transmitting substrate has a moisture permeation amount of 100 g/m$^2$ or less as measured for 24 hours under a condition of 40° C. and 100% humidity.

9. The polarizing plate according to claim 1, wherein a total thickness of the polarizer, the hard coating layer and the light-transmitting substrate is 200 μm or less.

10. The polarizing plate according to claim 1, wherein the polarizing plate further includes an adhesive layer disposed between the polarizer and the light-transmitting substrate and having a thickness of 0.1 μm to 5 μm.

11. A liquid crystal panel comprising the polarizing plate of claim 1 on at least one surface of a liquid crystal cell.

12. The liquid crystal panel according to claim 11, comprising two polarizing plates, wherein
each of the polarized plates formed on each surface of the liquid crystal cell,
wherein the two polarizing plates are positioned such that an MD direction of the polarizer of the polarizing plate formed on one surface of the liquid crystal cell and an MD direction of the polarizer of the polarizing plate formed on the other surface are perpendicular to each other.

13. A display device comprising the polarizing plate of claim 1.

* * * * *